United States Patent [19]

Schwartzman

[11] Patent Number: 5,125,443
[45] Date of Patent: Jun. 30, 1992

[54] SPRING MOUNTED WHEEL ASSEMBLY

[76] Inventor: Gil Schwartzman, 1025 Old White Plains Rd., Mamaroneck, N.Y. 10543

[21] Appl. No.: 686,047

[22] Filed: Apr. 16, 1991

[51] Int. Cl.⁵ .............................................. B60B 9/26
[52] U.S. Cl. ...................... 152/84; 152/86; 152/69; 301/104
[58] Field of Search ............... 152/1, 5, 11, 12, 17, 152/69, 75, 80, 84, 85, 86, 81, 82; 301/55, 56, 57, 58, 59, 104, 105 B

[56] References Cited

U.S. PATENT DOCUMENTS

| | | | |
|---|---|---|---|
| 396,872 | 1/1889 | Hicks | 152/84 |
| 691,717 | 1/1902 | Furmidge | 152/86 |
| 1,164,887 | 12/1915 | Strauch et al. | 152/84 |
| 1,519,898 | 12/1924 | Beisel | 152/84 |

FOREIGN PATENT DOCUMENTS

| | | | |
|---|---|---|---|
| 14480 | of 1899 | United Kingdom | 152/80 |
| 22218 | of 1908 | United Kingdom | 152/80 |

Primary Examiner—Russell D. Stormer
Attorney, Agent, or Firm—Cohen, Pontani, Lieberman & Pavane

[57] ABSTRACT

A wheel assembly is disclosed having a circular rim that lies in and defines a plane of rotation, a pair of opposed hubs spaced outwardly from the plane of rotation along an axis of rotation of the wheel, the axis of rotation bisecting the plane of rotation at the center of a circle defined by the rim within the plane, and a plurality of spring members arranged in laterally-opposed sets, each of which spring members radiates in an outwardly expanding, generally conical and helical manner from a point of attachment on the rim to a point of attachment on one of the hubs, thereby imparting to the wheel the ability to withstand improved vertical and/or horizontal displacements while providing advantageous self-centering and recentering abilities when the wheel rim is displaced from the rotative plane or from its normally centered relation to the axis of rotation.

6 Claims, 2 Drawing Sheets

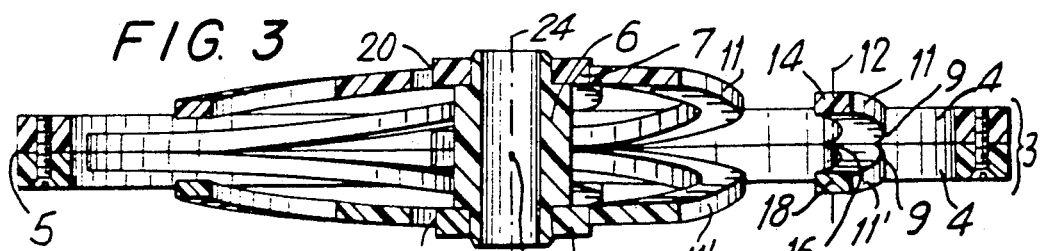
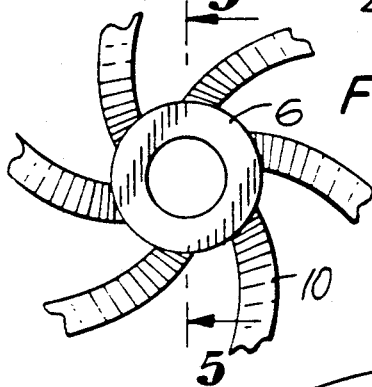
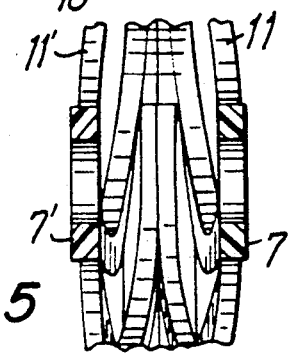
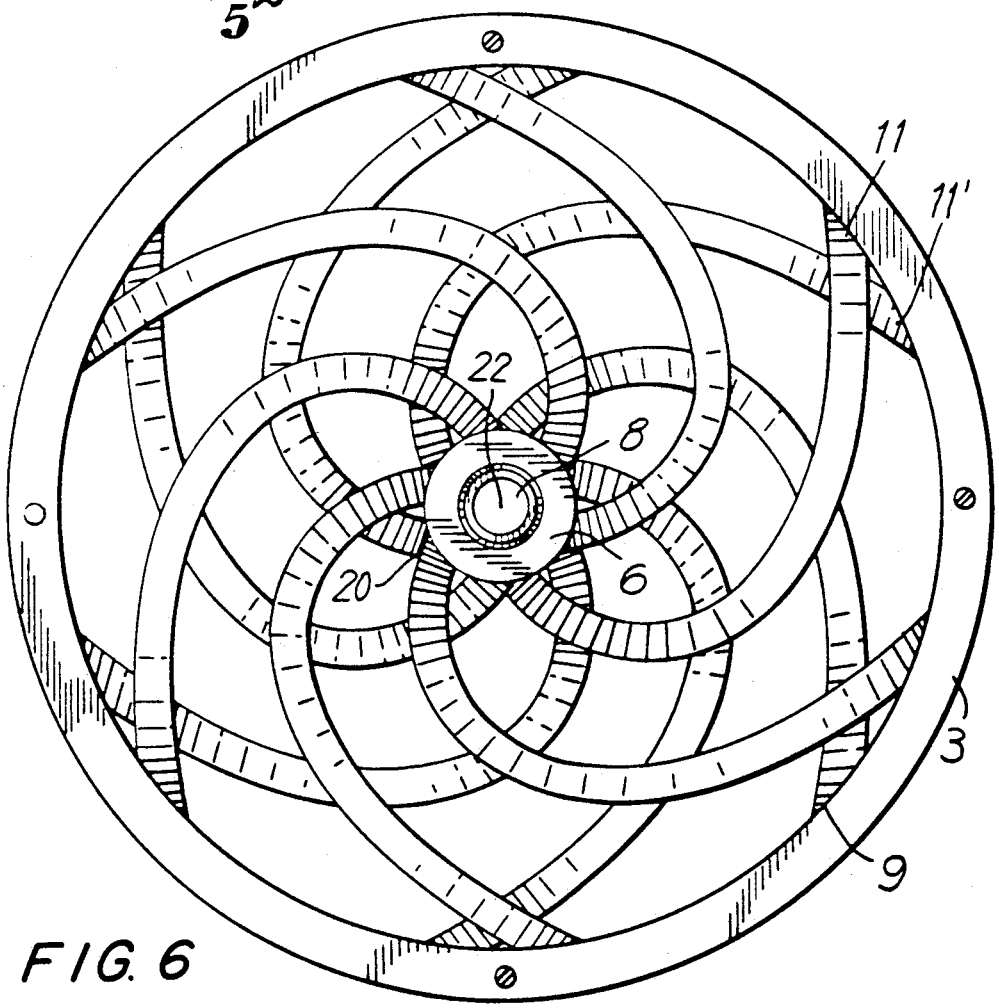

SPRING MOUNTED WHEEL ASSEMBLY

FIELD OF THE INVENTION

The present invention relates to a wheel assembly having a circular frame, or rim, which is connected by a plurality of members to a central hub, and more particularly to a "floating" wheel design having flexible, spring-like arcuate members which radiate in an outwardly expanding, generally conical and helical direction from a hub to the rim so as to impart improved load distribution and self-centering abilities when mounted to a vehicle or other movable device.

BACKGROUND OF THE INVENTION

Attempts have been made to develop wheel designs that provide simpler attachment to an axle, or are more resilient, or possess better load distributin to impart improved performance to vehicles such as bicycles, roller skates and other movable objects on which they are mounted. Known designs include spoke members that are straight and/or coplanar with the wheel, i.e. that reside within the plane formed by the circular cross-section of the tire and axle, also defined here as the plane of rotation. When wheels are so configured, they absorb vertical and/or horizontal displacement forces poorly, and lack the ability to self-center or recenter when placed under load or while encountering such forces. Likewise, sudden impacts from obstructions or potholes can force the wheel to be out of "true", requiring wheel removal and "retruing", straightening or replacement.

Moreover, typical designs also include a continuous axle shaft that extends along the full distance from the outer to the inner hub of the wheel, inhibiting peak performance and requiring additional materials.

For example, U.S. Pat. No. 813,423 to Hill reveals claw-shaped retaining devices for attaching wheels to axles. Hill's design includes straight wire spokes connecting each hub to the rim of the wheel, for standard force distribution, as well as a full axle shaft passing from hub to hub.

U.S. Pat. No. 1,141,078 to Sleffel discloses an improvement upon Hill's design through elimination of the retaining devices that attach the hub to the axle. Sleffel also reveals straight wire spokes and a full axle shaft.

U.S. Pat. No. 515,456 to Wood addresses primarily the hub portion of a vehicle wheel, and shows arcuate spokes lying within the plane of rotation of the wheel and traveling in an arc from the hub to the rim of the wheel.

U.S. Pat. No. 2,869,608 to Chamberlin, et al. reveals a spring wheel design for automobile tires having flat spring strips (instead of spokes) which radiate inwardly from each hub to the rim of the wheel and are also wholly within the plane of rim rotation.

Lastly, U.S. Pat. No. 1,253,975 to Howard, et al. discloses a plurality of non-coplanar spokes which are attached to a plurality of independent rims.

These prior art devices, accordingly, all fail to provide, as the present inventor has discovered, a resilient, self-centering wheel that allows greater cornering ability and traction due to improved force distribution. Also, the prior art wheel designs typically and frequently need to be trued after impact or collision with fixed objects or obstructions such as rocks or potholes. Likewise, the prior art wheel designs have proven unwieldy or cumbersome in construction without a corresponding gain in performance.

Accordingly, it is an object of the present invention to provide a wheel that readily absorbs vertical and/or horizontal displacements.

It is a further object of the present invention to provide a wheel that enables self-centering or recentering when transversely or obliquely-directed stresses are applied.

It is yet a further object of the present invention to provide a wheel with improved cornering and traction when placed on a vehicle such as a bicycle, roller skate or similar mobile object.

It is still a further object of the invention to provide a wheel assembly that sufficiently redistributes or "off-loads" sudden impacts to prevent the need for frequent removal and retruing.

SUMMARY OF THE INVENTION

The foregoing and other objects of the instant invention are achieved by the provision of a wheel assembly having a circular frame, or rim, which is connected by a plurality of spring members to a central hub. The circular rim lies in a plane of rotation having an axis of rotation substantially perpendicular to and bisecting the rotational plane at the center of the circle defined by the rim within the plane. The wheel assembly further includes arcuate spring members which radiate in an outwardly expanding, generally conical and helical fashion from the hub to the rim and provide an outwardly directed urgency against the rim of the wheel to improve resilience and add greater impact resistance.

In a further embodiment of the invention, two sets of helical spring members are provided, one on either side of the plane of rotation, traveling generally conically from either side of the hub to the rim of the wheel.

In yet a different embodiment, each of the spring members in each of the sets has a conforming spring member in the other set, such that the first of the pair conforms with the other of the pair at the point of origin, along its generally conical length, and to its point of attachment on the hub.

In a further, different embodiment, the helical spring members in one set do not alignedly conform with the other, or are equally juxtaposed or offset so as to form a preselected pattern.

In yet a further embodiment, the helical spring members in one set extend in an arcuately outward and clockwise direction, while those in the other set extend in a counterclockwise direction, when viewing the wheel assembly from the perspective of one side of the rotational plane.

In yet a further and different embodiment, the axle is discontinuous from one hub to the other, i.e. the wheel is attached by dual inserts, one for each hub on each side of the wheel, with the space between the hubs remaining open or lacking a bridging connection between the opposed hubs.

The selection of the specific configuration or pattern for the double helical structure of the inventive wheel assembly is at least partially a function of the specific kind and type of force distribution sought, or of the cornering or traction ability required by the particular application. Thus, mountain bicycle tires may require a non-conforming juxtaposition of both sides of the helical structure to impart the greatest amount of flexibility and improved spring quality, whereas the substantially alike or conforming sets of double helixes may impart greater cornering ability to a single blade-type roller skate, i.e. a so-called roller blade or the like.

BRIEF DESCRIPTION OF THE DRAWINGS

Other objects and many of the attendant advantages and features of the present invention will be readily appreciated and better understood by reference to the following detailed description when considered in connection with the accompanying drawings wherein like reference numerals designate like parts throughout the figures thereof, and in which:

FIG. 3 is a cross-sectional view of the wheel assembly shown in FIG. 1 along the lines 3—3 thereof;

FIG. 4 is a partial side view of the hub and helical spokes of an alternative embodiment of the instant invention lacking an axle 8;

FIG. 5 is a cross-sectional view of the embodiment shown in FIG. 4 along the lines 5—5 thereof; and FIG. 6 is a side view of an alternative embodiment of the wheel assembly shown in FIG. 1 having a different spatial arrangement of the helical spokes.

DETAILED DESCRIPTION OF THE PREFERRED EMBODIMENTS

Figure 1:
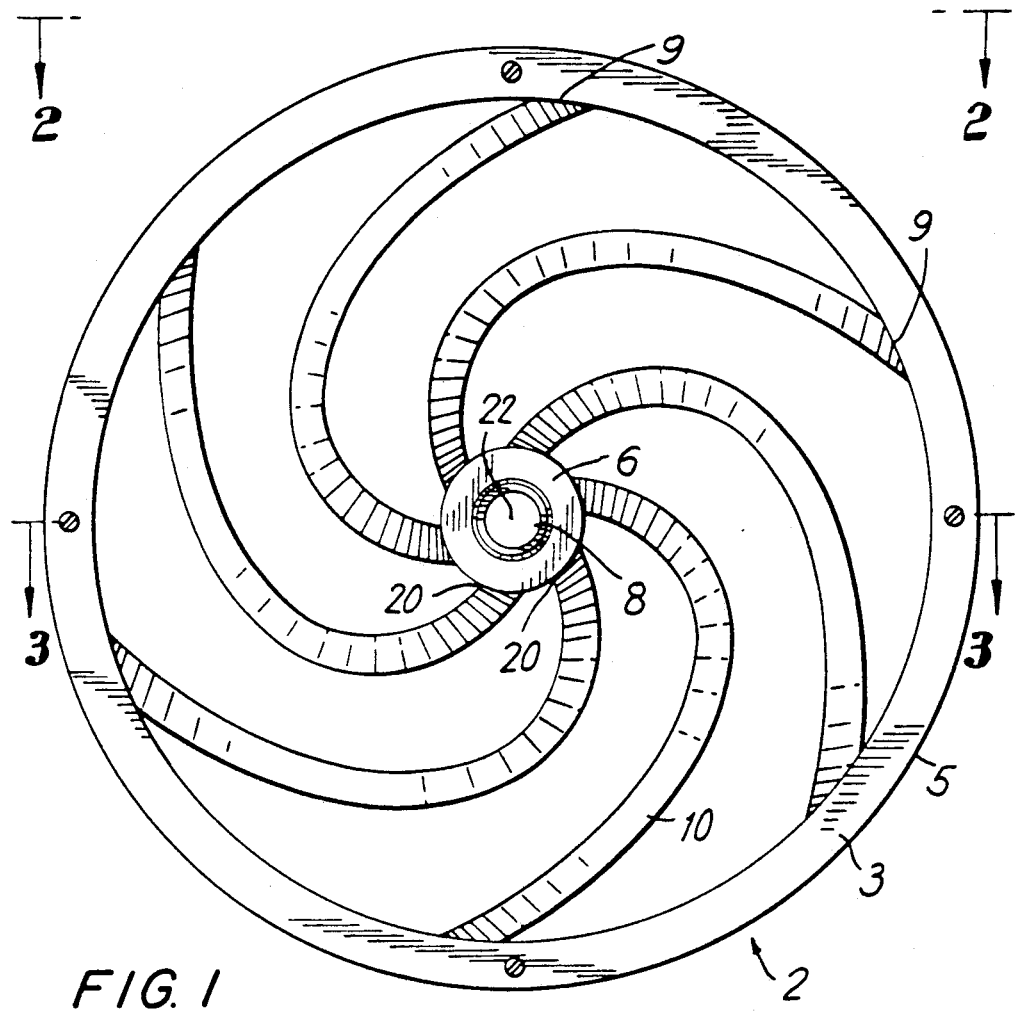
FIG. 1 is a side view of a wheel assembly in accordance with the instant invention having arcuate spring members.

In FIG. 1, a wheel assembly 2 includes a circular frame or rim 3 and hub, 6, in this instance shown attached to or receivingly surrounding an axle 8. Resiliently flexible arcuate spring members or spokes 10 radiate outwardly from points of attachment 20 on hub means 6 to points of attachment 9 on rim 3, and thus create an outwardly directed urgency against the rim 3. Although the side view of FIG. 1 appears to show spring members 10 lying within the rotational plane of rim 3, it should be understood that members 10 actually radiate outwardly from the plane of rotation as shown in greater detail in, for example, FIG. 2. Points of attachment 9 and 20 may be implemented as any number of attachment devices or arrangements or methods not specifically shown including, by way of example, threaded members that screw into recesses and receive bolt assemblies that readily allow for tightening, balancing, and/or replacement of individual ones of the arcuate members 10 should damage occur thereto in use.

Figure 2:
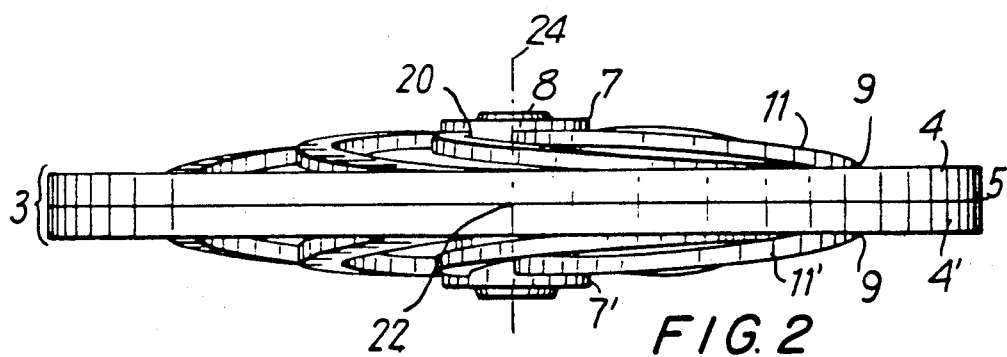
FIG. 2 is a top plan view of the inventive wheel assembly in accordance with the preferred embodiment shown in FIG. 1.

As may be observed in FIG. 1, when the wheel assembly 2 is caused to operatively spin or rotate around axle 8, the circular periphery of rim 3 shown in FIG. 1 defines a substantially flat plane of rotation 5 (FIG. 2). Likewise, such spinning or rotation further defines an axis of rotation 24 which intersects the plane of rotation 5 at a substantially centrally-located point of intersection 22.

It should also be both appreciated and apparent that the axle 8 may be attached by any number of means or structures, generally as a matter of design choice, to a vehicle or other device where motion, as for example along a ground or supporting surface, is sought or intended. Such means of attachment may, by way of example, include a fork (as in common association with a front wheel or tire of a bicycle), a drive system, a bearing assembly, or any other attachment and pivoting system known or apparent to one skilled in the art.

When the wheel assembly 2 of FIG. 1 is placed in motion, i.e. is caused to spin on its axle 8, and the rim 3 collides or otherwise comes into dynamic contact with a rock or similar obstruction in its path of motion, various forces are applied to and stress the assembly 2. As a consequence of the inventive configuration shown, these stresses are distributed to portions of the wheel assembly 2 in a manner that tends to maintain or return the axle within its normal rotation and proper axis of rotation. That is, the greatest stress is applied in the area of the rim 3 proximate to the point of impact and is carried by the rim 3 primarily to at least the immediately neighboring arcuate spring members 10. These forces or stresses are also carried, to proportionally lesser extents, to those arcuate members 10 connected to the rim 3 at locations relatively more remote to the point of impact. As a consequence of the arcuate, generally helical structure of the members 10 these neighboring members 10 withstand greater compressive forces than the straight or coplanar spokes of the prior art, and thus will radially absorb a substantial portion of the forces generated by the collision. Likewise, the inventive wheel construction provides for off-loading of greater forces by more distant members 10 which receive proportionally-reduced forces transmitted along the rim 3 and also maintain greater radial compressive qualities as a consequence of their helical configuration. Thus, such a collision will frequently fail to cause any appreciable offset or displacement of the central hub means 6 or the axle 8 and, as importantly, of the rim 3. Moreover, the inventive wheelconstruction —particularly by virtue of the management of the helical elements 10—is especially effective, where the collision causes displacement of the rim 3 obliquely at the normal rotational plane 5, for urging the rim forward and back into alignment with the plane 5, thereby providing important and advantageous self-centering and recentering functionality in use.

Another advantageous aspect of the spring wheel of the present invention is its ability to provide, in the context of a wheel of a moving vehicle, graduated or spring braking of the vehicle. When rotation of a shaft on which the inventive spring wheel is mounted, or of the spring wheel hub directly, is rapidly slowed or halted by operation of braking apparatus of the vehicle, the resilience of the helical spoke elements 10 enables a brief interval of continued and gradually decreasing rotation of the rim 3 relative to the hub 6. Accordingly, even if the hub rotation is immediately and instantaneously halted through, for example, user application of the vehicle's brakes, the rim 3 continues to rotate for a brief period in which its rotation, relative to the hub and, generally, to the supporting ground surface along which the vehicle is moving, only gradually decreases to an eventual halt. In this manner the moving vehicle is brought to a complete stop with enhanced comfort and—by thereby discouraging skidding of the wheel periphery along the ground surface as the vehicle is braked—safety through the resilience of the helical spoke members 10 of the spring wheel of the invention.

It should be understood that the size and relative density—e.g. the number and spacing of the plural members 10 about the rim 3 and hub 6—of members 10, as well as the materials selected for their construction or fabrication, will generally determine the forces that the wheel assembly can normally endure and resist. Though typically larger forces would suggest denser materials, the spring-like ability of the members must also be considered in such an analysis and will often dictate the use of lighter, more resilient materials. In some instances, for example, plastics or spring steel may be the materials of choice in that greater resilience can be imparted to the wheel assembly without unduly increasing the weight or density of the material or the size of the individual members 10.

In some instances, a collision will occur that results in the generation of forces directed primarily transversely or obliquely, i.e. to the side, of the wheel assembly 2 and may, thus, directly impact certain ones of the members 10. Such members, however, have improved resilience and resistance to deformation as a consequence of their arcuate, helical configuration, and will thus withstand greater impact forces than strut or spoke-like wheel elements of the prior art. Similarly, although the displaced members may be caused to bend or deform, such bending will also not appreciably offset the normal alignment of the assembly 2 within the rotational plane 5 or centrally at the rotational axis 24 as a consequence of the arcuate and helical shape of the displaced members 10 which provide greater deflection distances than would straight spoke members. Likewise, off-loading and distribution of applied forces to surrounding and proximately-disposed members 10 further assists in maintaining the self-centering and recentering capabilities of the wheel assembly 2.

FIG. 2 shows a top plan view of the wheel assembly 2 of FIG. 1, wherein the plane of rotation 5 separates the upper and lower-shown sides of the rim 3 into wheel portions 4 and 4', respectively. A second, laterally-opposed of the helical elements 10 of the wheel construction seen in FIG. 1 is visible in FIG. 2 in which each corresponding wheel part is delineated by the prime designation (') identifier. Thus, the hub means 6 is shown having first or upper and second or lower segments 7 and 7', respectively, on opposite sides of the plane of rotation 5. The arcuate members 10 are shown as comprising two sets of helical members 11 and 11', each such set tapering outwardly from the rotational plane 5 in a conical direction from their points of attachment 9 along the rim 3 to their points of attachment 20 along the hub means 6. The axis of the cone-like configuration thereby suggested lies along the axis of rotation 24.

FIG. 2 further reflects an embodiment of the instant invention wherein each of the upper and lower helical members 11 and 11' extends outwardly from the plane 5 with the same conformational rotative sense as the other, i.e. each of the members 11 has a mirror-image member 11' on opposite sides of the plane of rotation 5. It can be further observed that when viewing the wheel assembly 2 shown in FIG. 2 from one side of the plane of rotation 5, as in FIG. 1, the members 11 and 11' not only travel in the same arcuate direction, i.e., either clockwise or counterclockwise but, in addition, are attached to the rim 3 and the hub 6 at correspondingly aligned circumferential positions along the rim and hub, respectively.

FIG. 3 depicts the wheel assembly of FIGS. 1 and 2 along the cross-sectional line 3—3 of FIG. 1 and further reveals the mirror-image nature of the helical members 11 and 11' in this first preferred embodiment of the invention. In FIG. 3 a dotted line 12, parallel to the axis of rotation 24, can be drawn bisecting the members 11 and 11' and thereby defining three points of intersection 14, 16 and 18. Point 14 constitutes a midpoint longitudinally along the member 11, point 16 lies at the intersection of line 12 with plane of rotation 5, and point 18 is a midpoint longitudinally along the opposed member 11'. In this embodiment, as can be observed in FIG. 3, the distance between the points 14 and 16 equals the distance between the points 16 and 18. Furthermore, for any line 12 that lies parallel to the axis of rotation 24 and extends through two opposed members 11 and 11', each of the points of intersection of the line 12 with the members 11 and 11' will always be equidistant from the plane of rotation 5.

Numerous variations to the above-disclosed structural arrangement of this first embodiment of the inventive wheel assembly depicted in FIGS. 1 to 3—wherein each set of helical elements 11, 11' radiates outwardly from the rotational plane 5 in the same rotative (i.e. clockwise or counterclockwise) sense as viewed from one side of the plane 5—are within the intended scope and contemplation of the invention. For example, the helical elements 11 of one set thereof may be of the same length, arcuate configuration, number and spacing as the helical elements 11' of the opposed set (as in FIGS. 1 to 3) but rotationally offset with respect to the second set so that the attachment points or locations of the elements 11 to and along the rim 3 and the hub 7 are out of opposed alignment with the corresponding attachment points or locations of the elements 11' to and along the rim 3 and hub 7'. In another or further modification, each set of helical elements 11, 11' includes a different number of such elements, and/or different or varied spacing between the individual adjacently-disposed helical elements of the two opposed sets. It is also contemplated that the elements 11, 11' of the opposed sets may have different lengths, and/or different degrees of angular arcuity. Embodiments in which the outward extension of the elements 11 of one set from the rotational plane 5 is different from the outward extension of the elements 11' of the opposed set—so that the hubs 7, 7' are spaced along the rotative axis 24 from the plane of rotation 5 by different amounts—are also within the intended scope of the invention.

Referring now to FIGS. 4 and 5, a somewhat modified embodiment therein shown contemplates the elimination of the continuous axle shaft or sleeve 8 shown, for example, in FIG. 3 as a solid element connecting the opposed hubs 7, 7'. Eliminating the axle so that the inventive wheel assembly may be rotationally supported independently by the two opposed and unconnected hubs 7, 7' creates, inter alia, a lighter wheel and uses less constructional material, a particularly advantageous attribute both from a manufacturing perspective and in many potential applications such as roller skates in which weight reduction is an especially desirable feature. Advantageously, the elimination of the continuous axle or sleeve 8 connecting the hubs 7, 7' does not adversely affect the self-centering or recentering abilities of the wheel 2, at least in part as a consequence of the outwardly-directed urgency of the arcuate spring members 11, 11'. Indeed, in some applications this modified construction may enable the inventive wheel assembly to better tolerate and self-center after certain force-applying collisions or contacts with implements in its path of rotative motion.

The embodiment shown in FIGS. 4 and 5 may be operatively attached to a vehicle or movable device in, as a matter of design choice, any of a multiplicity of known manners including, by way of example, via an insert or peg placed in each of the cavities formed in the hubs 7 and 7' by the absence of a continuous shaft 8 such as is shown in the preceding figures. Likewise, such a peg may incorporate a bearing or other motion-facilitating assembly to allow pivoting. It is, of course, also within the intended scope and contemplation of the invention that the helical spring members 11, 11' be constructed so as to impart sufficient rigidity for maintaining the hubs in outwardly spaced relation to the rotational plane 5 in this embodiment, so the sleeve-like hubs 7, 7' may, if desired, simply be freely slidably supported on a common axle journaled therethrough or otherwise separately secured to individual mounts of any suitable type.

Finally, FIG. 6 illustrates yet a further modified or alternative embodiment wherein the opposed sets of arcuate, spring-like helical members 11, 11' are juxtaposed so as to arc or extend outwardly from the rim 3 in respectively opposite rotational senses on the respective opposite sides of the plane 5, thereby forming a spaced apart but visually-overlapping pattern. Thus, when viewing the FIG. 6 embodiment from one side of the plane of rotation 5, the members 11 appear to curve outwardly from the rim 3 in the counterclockwise direction, whereas the members 11' curve outwardly from the rim in the clockwise direction or sense. The selection of the exact configuration or pattern of the resulting double helical structure of the inventive wheel assembly may be determined in accordance with the needs or intended attributes to be provided for the particular environment, application, and force distribution, cornering, traction, and other abilities sought. Moreover, as described in connection with the earlier-disclosed embodiments of the inventive wheel assembly, the arrangement of FIG. 6 may be further modified to vary, for example, one or more structural and/or positional aspects of the arcuate or helical elements 11, 11', both (or either) as to individual elements within one of the opposed sets thereof and as between the spring elements of one set and those of the other. Thus, variations in the length, arcuate configuration, number, and/or inter-element spacing may be incorporated as to individual or plural ones of the spring elements 11, 11'. The attachment points of the spring elements 11 of one set to the rim 3, and/or to the hub 7, may be positionally aligned with respect to the corresponding attachment points of the elements 11' of the other set, or such attachment points may be rotationally offset by a constant or uniform amount about the wheel or by amounts which differ as one moves circumferentially about the rim or hub. Moreover, the opposed hubs 7, 7' may be connected by a common or continuous shaft 8 or the like, or may be configured as separate and unconnected as in the embodiment of FIGS. 4 and 5. These and numerous other variations and modifications to the expressly shown and described arrangements should be understood as being within the fully intended scope and contemplation of the invention.

Thus, while various configurations of the opposed sets of helical spring elements 11, 11' and of other elements of the inventive wheel assembly have been shown and described, together with certain currently contemplated uses, it must be appreciated that such are provided merely by way of example, and numerous other arrangements and structural configurations could be utilized in practice that may vary from those described but still remain within the scope of the invention. Accordingly, while there have been shown, described and pointed out fundamental novel features of the invention as applied to several currently preferred embodiments thereof, it will be understood that various omissions, substitutions and changes in the form and details of the devices illustrated, and in their operation, may be made by those skilled in the art without departing from the spirit of the invention. It is the intention, therefore, to be limited only as indicated by the scope of the claims appended hereto.

What is claimed is:

1. A self-centering spring wheel assembly, comprising:

a circular wheel rim defining a substantially flat plane of rotation of said rim;

hub means for mountedly supporting said wheel assembly and defining an axis extending substantially perpendicularly through said plane and about which said rim is operatively rotatable, said hub means comprising a first hub and a second hub, said first hub being spaced outwardly from one side of said plane of rotation of the wheel rim and said second hub being spaced outwardly from an opposite side of said plane of rotation; and a plurality of resiliently flexible spring members, each said spring member extending helically outwardly from said plane of rotation and between and connecting said wheel rim and one of said first and second hubs;

said first and second hubs being spaced nonconnectedly apart for independent relative movability of each of said hubs with respect to said wheel rim so as to independently support said wheel rim for self-centering rotation about said axis and self-alignment of the wheel rim in the plane of rotation.

2. The wheel assembly of claim 1, wherein said axis of rotation extends through the substantial center of a circle defined by said circular rim in said plane of rotation.

3. The wheel assembly of claim 1, wherein said spring members form a first set and a second set of said spring members extending outwardly from opposite sides of said plane of rotation.

4. The wheel assembly of claim 3, wherein the spring members of each of said first and second sets of said members extend helically outward from the plane of rotation in a clockwise sense when said first and second sets are viewed from one side of said plane of rotation.

5. The wheel assembly of claim 3, wherein the spring members of said first set of said members extend helically outward from the plane of rotation in a clockwise sense when viewed from one side of said plane of rotation, and the spring members of said second set of said members extend helically outward from the plane of rotation in a counterclockwise sense when viewed from said one side of the plane of rotation.

6. The wheel assembly of claim 3, wherein each of said first and second sets of said spring members form a generally conical configuration of said spring members.

* * * * *